United States Patent
Butcher et al.

(10) Patent No.: US 6,913,844 B2
(45) Date of Patent: Jul. 5, 2005

(54) METHOD FOR HUMIDIFYING REACTANT GASES FOR USE IN A FUEL CELL

(75) Inventors: Kenneth R. Butcher, Hendersonville, NC (US); Donald E. Floyd, II, Greenville, SC (US)

(73) Assignee: Porvair Corporation, Hendersonville, NC (US)

( * ) Notice: Subject to any disclaimer, the term of this patent is extended or adjusted under 35 U.S.C. 154(b) by 561 days.

(21) Appl. No.: 09/895,687

(22) Filed: Jun. 29, 2001

(65) Prior Publication Data

US 2003/0012992 A1 Jan. 16, 2003

(51) Int. Cl.[7] .............................. H01M 8/04; H01M 8/06
(52) U.S. Cl. .............................. 429/17; 429/38; 429/39
(58) Field of Search .............................. 429/17, 38, 39, 429/12.22, 26.34; 261/130

(56) References Cited

U.S. PATENT DOCUMENTS

| | | | |
|---|---|---|---|
| 3,061,658 A | | 10/1962 | Blackmer |
| 3,279,772 A | * | 10/1966 | Mohr .......................... 261/104 |
| 3,507,702 A | | 4/1970 | Sanderson |
| 3,677,823 A | | 7/1972 | Trocciola |
| 4,129,685 A | | 12/1978 | Damiano |
| 4,177,328 A | | 12/1979 | Rogers |
| 4,463,067 A | | 7/1984 | Feigenbaum |
| 4,530,886 A | | 7/1985 | Sederquist |
| 4,584,249 A | | 4/1986 | Smithrick |
| 4,643,954 A | | 2/1987 | Smith |
| 4,765,396 A | * | 8/1988 | Seidenberg ............ 165/104.26 |
| 4,769,297 A | | 9/1988 | Reiser et al. |
| 4,826,742 A | | 5/1989 | Reiser |
| 4,883,116 A | * | 11/1989 | Seidenberg et al. ..... 165/104.26 |
| 4,929,414 A | * | 5/1990 | Leonard et al. ................. 419/2 |
| H0858 H | * | 12/1990 | Leonard et al. ............. 429/104 |
| 5,064,732 A | | 11/1991 | Meyer |
| 5,176,966 A | | 1/1993 | Epp et al. |
| 5,246,551 A | | 9/1993 | Pletcher et al. |
| 5,262,250 A | | 11/1993 | Watanabe |
| 5,314,761 A | | 5/1994 | Pietrogrande et al. |
| 5,322,744 A | * | 6/1994 | Koseki .......................... 429/13 |
| 5,358,799 A | * | 10/1994 | Gardner ........................ 429/26 |
| 5,368,786 A | * | 11/1994 | Dinauer et al. ............. 261/130 |
| 5,382,478 A | | 1/1995 | Chow et al. |
| 5,432,023 A | | 7/1995 | Yamada et al. |
| 5,458,837 A | * | 10/1995 | Roberts et al. .......... 156/89.11 |
| 5,534,363 A | | 7/1996 | Sprouse et al. |
| 5,641,586 A | | 6/1997 | Wilson |
| 5,686,199 A | | 11/1997 | Cavalca et al. |
| 5,705,118 A | * | 1/1998 | Hayes et al. ................. 264/656 |
| 5,759,394 A | * | 6/1998 | Rohrbach et al. ........... 210/264 |
| 5,853,909 A | | 12/1998 | Reiser |
| 5,891,221 A | * | 4/1999 | Rohrbach et al. ............. 95/159 |
| 5,972,530 A | | 10/1999 | Shelekhin et al. |
| 5,998,058 A | | 12/1999 | Fredley |
| 6,015,633 A | * | 1/2000 | Carlstrom et al. ............ 429/13 |
| 6,057,051 A | | 5/2000 | Uchida et al. |
| 6,066,408 A | * | 5/2000 | Vitale et al. .................. 429/26 |
| 6,080,357 A | | 6/2000 | Sugikawa |
| 6,146,779 A | * | 11/2000 | Walsh .......................... 429/26 |
| 6,210,612 B1 | | 4/2001 | Pickrell et al. |
| 6,221,522 B1 | | 4/2001 | Zafred et al. |
| 6,232,005 B1 | | 5/2001 | Pettit |
| 6,232,010 B1 | | 5/2001 | Cisar et al. |
| 6,235,665 B1 | | 5/2001 | Pickrell et al. |
| 6,383,519 B1 | * | 5/2002 | Sapieszko et al. .......... 424/489 |
| 6,555,262 B1 | * | 4/2003 | Kaiser et al. ................. 429/34 |

* cited by examiner

Primary Examiner—Mark Ruthkosky
(74) Attorney, Agent, or Firm—Carter Schnedler & Moteith, P.A.

(57) ABSTRACT

A system for humidifying a gas, the system including a housing defining a humidification chamber through which a gas travels, and a humidification assembly adjacent to the housing. The humidification assembly includes a source of humidifying liquid and a porous wick for carrying the humidifying liquid from the source of the humidifying liquid into the humidification chamber. The wick separates the source of humidifying liquid from the humidification chamber such that the humidifying liquid flows through the wick before humidifying the gas traveling through the humidification chamber.

3 Claims, 4 Drawing Sheets

METHOD FOR HUMIDIFYING REACTANT GASES FOR USE IN A FUEL CELL

BACKGROUND OF THE INVENTION

This invention relates to a gas humidification system.

Although the system of the present invention may be used in a variety of environments, without limitation it is discussed herein in the context of fuel cells. Fuel cell technology is being further and further refined with a view toward its replacement of common, environmentally destructive power sources such as the internal combustion engine.

Although there are several types of fuel cells, the present invention is primarily related to proton exchange membrane or polymer electrolyte membrane (PEM) fuel cells, the type of cells currently thought to be best suited for transportation applications such as passenger vehicles. In PEM fuel cells, two electrodes—an anode and a cathode—are separated by a membrane that functions as an electrolyte. The electrolyte permits protons to pass through the membrane while blocking electrons from flowing through the membrane. Catalysts are provided in the anode and cathode sides of the cell to help cause this electrochemical reaction.

The reaction occurs when molecules of hydrogen gas ($H_2$) enter the anode side of the fuel cell. The anode, together with the catalyst on the anode side of the cell, repels the electrons of the hydrogen molecules. In addition, the electrolyte membrane prohibits passage of electrons therethrough. As a result, the electrons of the hydrogen molecules travel around the membrane by means of an external electrical circuit as the protons of the hydrogen molecules travel through the membrane. The stream of electrons through the external electrical circuit is utilized as an electrical power source. On the cathode side of the cell, oxygen or an oxygen-containing gas is provided. After the hydrogen electrons ($H^-$) reenter the fuel cell and the hydrogen protons ($H^+$) pass through the membrane, the cathode and the associated catalyst cause the hydrogen electrons and protons to react with the oxygen in the cathode side of the cell to produce water ($H_2O$).

Many technical problems have arisen as PEM fuel cells have been developed and tested in various contexts. One such problem is membrane dryout. Specifically, if the membrane drops below a certain humidity, ion conduction through the membrane is reduced, thereby reducing cell efficiency and eventually causing cell failure. This dryout occurs as a natural result of cell operation and will not be remedied unless a system for accomplishing membrane humidification either accompanies or is incorporated within the cell.

Some inventions addressing the membrane dryout problem employ flow-through plates or membranes to transport water or other humidifying liquids to the fuel cell membrane. For instance, U.S. Pat. No. 4,769,297 to Reiser et al., U.S. Pat. No. 5,064,732 to Meyer, and U.S. Pat. No. 5,853,909 to Reiser disclose porous humidification plates situated between adjacent cells in a fuel cell stack for transporting product water from the cathode of one fuel cell to the anode of an adjacent fuel cell to achieve humidification. However, these products require maintenance of a constant pressure differential across the humidification plate to achieve the desired water flow. The sudden, transient pressure increases that periodically occur in these systems exacerbate the problem of pressure differential regulation. In an effort to remedy these concerns, pressure regulators and related devices are frequently incorporated into the fuel cell stack design; construction and maintenance costs, in addition to overall failure probability, are increased by the addition of this machinery.

U.S. Pat. No. 5,382,478 to Chow et al. discloses a humidification assembly including a large plurality of humidification cells, each cell being formed by a water vapor transport membrane between two flow field plates. Although pressure differential maintenance is less of a concern in this design, the complexity of this humidification assembly increases the cost and failure probability of the fuel cell assembly.

Earlier fuel cell designs, such as that disclosed in U.S. Pat. No. 3,061,658 to Blackmer, include water reservoirs with membranes or other absorptive materials carried therein to facilitate a wicking, capillary action of water into reactant gases passing over the reservoirs before entering the fuel cell. Such designs are simpler and less costly than those discussed above; however, because the absorptive materials are not sealed at their edges to form a semi-permeable barrier between the water source and the reactant gases, pressure differentials between the gases and the water can cause flooding of water into the gas passages or bubbling of water in the reservoir, thereby causing overhumidification or underhumidification, respectively, of the gases and, by extension, the fuel cell membrane. Designs employing wicks in fluid communication with reservoirs, such as those disclosed in U.S. Pat. No. 3,507,702 to Sanderson and U.S. Pat. No. 3,677,823 to Trocciola, experience similar problems.

SUMMARY OF THE INVENTION

One aspect of the present invention is a system for humidifying a gas, the system including a housing defining a humidification chamber through which a gas travels, and a humidification assembly adjacent to the housing. The humidification assembly includes a source of humidifying liquid and a porous wick for carrying the humidifying liquid from the source of the humidifying liquid into the humidification chamber. The wick separates the source of humidifying liquid from the humidification chamber such that the humidifying liquid flows through the wick before humidifying the gas traveling through the humidification chamber.

Another aspect of the present invention is a system for humidifying a reactant gas for use in a fuel cell, the system including a housing defining a humidification chamber through which a reactant gas travels before participating in an electrochemical reaction in a fuel cell, and a humidification assembly adjacent to the housing. The humidification assembly includes a source of humidifying liquid and a porous wick for carrying the humidifying liquid from the source of the humidifying liquid into the humidification chamber. The wick separates the source of humidifying liquid from the humidification chamber such that the humidifying liquid flows through the wick before humidifying the reactant gas traveling through the humidification chamber.

Yet another aspect of the present invention is a system for humidifying a proton exchange membrane in a fuel cell, the system comprising a fuel cell having a proton exchange membrane and a porous wick for humidifying the proton exchange membrane of the fuel cell, the wick comprising a ceramic formed from a mixture comprising a zirconium compound, aluminum oxide, water, nitric acid, and hollow polymer spheres.

Yet another aspect of the present invention is a system for humidifying a proton exchange membrane in a fuel cell, the system comprising a fuel cell having a proton exchange membrane and a porous wick for humidifying the proton exchange membrane of the fuel cell, the wick comprising a metal formed from a mixture comprising metal powder, a binding agent, water, and hollow polymer spheres.

Yet another aspect of the present invention is a method for humidifying gases, the method comprising the steps of providing a housing defining a humidification chamber through which a gas travels, further providing a humidification assembly adjacent to the housing, the humidification assembly comprising a porous wick and a source of humidifying liquid, wherein the porous wick separates the source of humidifying liquid from the humidification chamber such that the humidifying liquid flows through the wick before humidifying the gas traveling through the humidification chamber. The method also includes the steps of communicating the humidifying liquid into the wick, receiving the gas in the humidification chamber, and humidifying the gas with humidifying liquid as the gas flows across the wick in the humidification chamber.

Yet another aspect of the present invention is a method for humidifying reactant gases for use in a fuel cell, the method comprising the steps of providing a housing defining a humidification chamber through which a reactant gas travels before participating in an electrochemical reaction in a fuel cell, further providing a humidification assembly adjacent to the housing, the humidification assembly comprising a porous wick and a source of humidifying liquid, wherein the porous wick separates the source of humidifying liquid from the humidification chamber such that the humidifying liquid flows through the wick before humidifying the reactant gas traveling through the humidification chamber. The method also includes the steps of communicating the humidifying liquid into the wick, receiving the reactant gas in the humidification chamber, and humidifying the reactant gas with humidifying liquid as the reactant gas flows across the wick in the humidification chamber.

Yet another aspect of the invention is a system for humidifying a reactant gas for use in a fuel cell, the system including a housing defining a humidification chamber through which a reactant gas travels before participating in an electrochemical reaction in a fuel cell, and a humidification assembly adjacent to the housing. The humidification assembly includes means for supplying humidifying liquid and means for wicking the humidifying liquid from said supplying means into the humidification chamber. The wicking means separates the supplying means from the humidification chamber such that the humidifying liquid flows through the wicking means before humidifying the reactant gas traveling through the humidification chamber.

BRIEF DESCRIPTION OF THE DRAWINGS

The present invention may be more completely described and understood with reference to the drawings, in which.

DETAILED DESCRIPTION OF THE INVENTION

Single-Wick Embodiment

Figure 1:
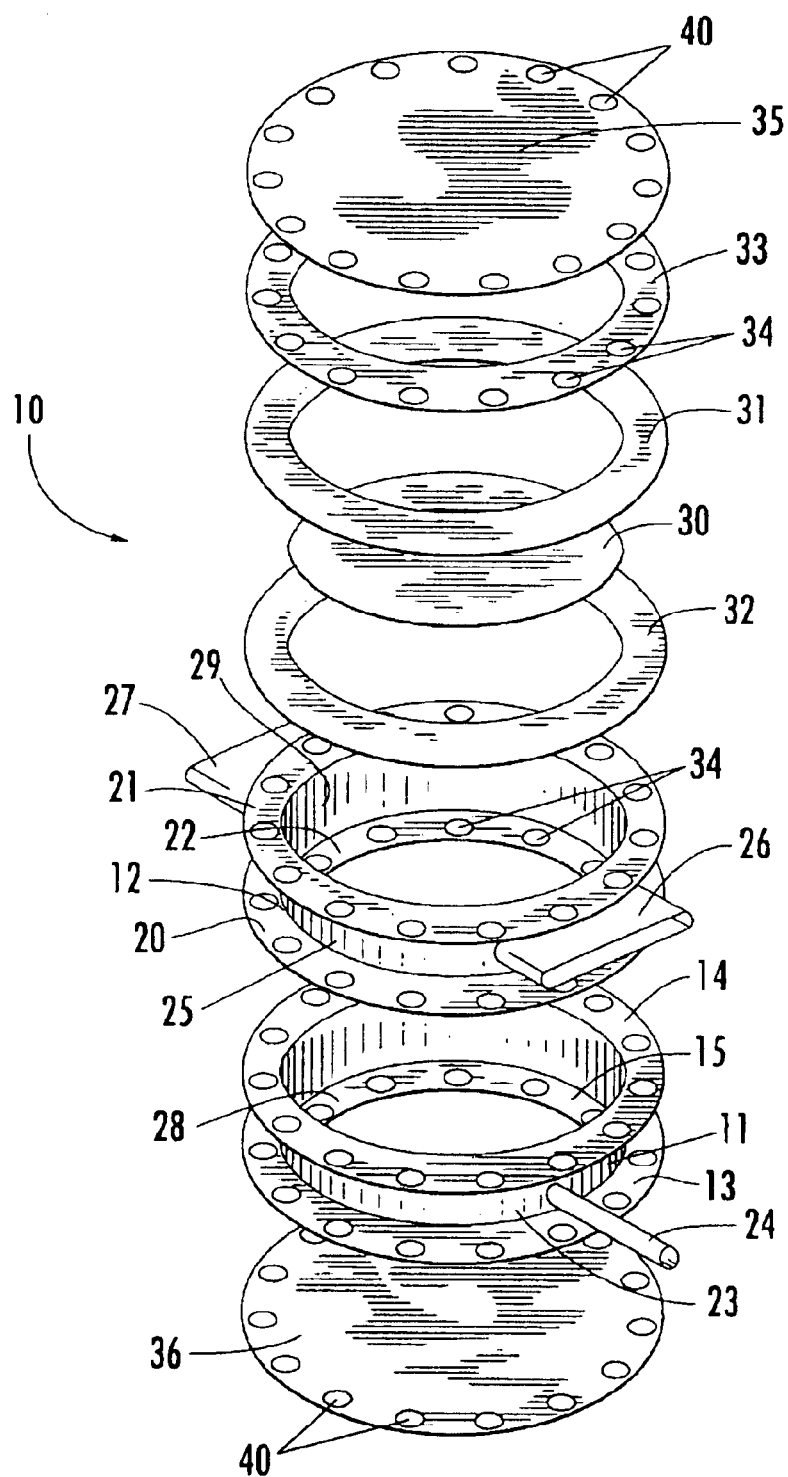
FIG. 1 is an exploded view of a single-wick embodiment of the invention.

Referring now to the drawings, FIG. 1 broadly illustrates a single-wick embodiment of the gas humidification system of the invention at reference numeral 10. The heart of the system comprises a pair of rings, a liquid-carrying ring 11 and a gas-carrying ring 12. The liquid-carrying ring 11 is provided with an outer lower flange 13, an outer upper flange 14, and an inner flange 15. Likewise, the gas-carrying ring 12 is provided with an outer lower flange 20, an outer upper flange 21, and an inner flange 22. Mounted on an external surface 23 of the liquid-carrying ring 11 is a pipe fitting 24 for permitting humidifying liquid to be introduced into the liquid-carrying ring 11. Mounted on the external surface 25 of the gas-carrying ring 12 is a gas inlet 26 and a gas outlet 27. Although FIG. 1 illustrates the gas inlet 26 and the gas outlet 27 as elongate rectangular slots, other suitable structures may be employed to achieve similar functions.

Mounted onto the inner flange 22 of the gas-carrying ring 12 is an assembly for communicating humidifying liquid from a liquid chamber 28 defined by the liquid-carrying ring 11 to a gas chamber 29 defined by the gas-carrying ring 12. At the heart of this assembly is a porous wick 30 between two ring gaskets 31, 32. The composition and method of manufacture of the wick 30 is discussed at length below. The wick 30 and the gaskets 31, 32 are covered by a metal compression ring 33 and mounted onto the inner flange 22 of the gas-carrying ring 12 utilizing bolts (not shown) and corresponding bolt holes 34. Therefore, in the assembled product, the inner flange 22 of the gas-carrying ring 12, together with the compression ring 33, bound the two gaskets 31, 32, which, in turn, bound the wick 30. The wick 30 is thereby secured to the gas-carrying ring 12 while a liquid-impermeable seal is maintained at the edge of the wick 30 by the gaskets 31, 32 as the gaskets 31, 32 and the wick 30 are compressed between the compression ring 33 and the inner flange 22 of the gas-carrying ring 12.

To complete the housing of this embodiment of the assembly, a top plate 35 is mounted to the outer upper flange 21 of the gas-carrying ring 12 and a bottom plate 36 is mounted to the outer lower flange 13 of the liquid-carrying ring 11. These mountings are achieved through the use of bolts (not shown) and corresponding bolt holes 40.

This embodiment of the invention operates as follows. Humidifying liquid, such as water, is pumped through the pipe fitting 24 into the liquid chamber 28 defined by the liquid-carrying ring 11 such that the wick 30 is filled with the liquid. A reactant gas, such as hydrogen, oxygen, or oxygen-containing air, is pumped through the gas inlet 26 into the gas chamber 29 defined by the gas-carrying ring 12. As the reactant gas passes over the wick 30, the humidifying liquid in the wick 30 flows through the wick 30 by capillary action and into the gas. The reactant gas is thereby entrained, i.e., humidified, with the humidifying liquid. The humidified gas then exits the assembly through the gas outlet 27 before participating in an electrochemical reaction in a proton exchange membrane or polymer electrolyte membrane (PEM) fuel cell (not shown). As described above, the humidity of the gas humidifies the membrane of the fuel cell when the gas encounters the membrane, thereby preventing membrane dryout and the associated efficiency reduction and possible failure of the fuel cell.

The nature of the porosity of the wick 30, discussed in detail below, substantially enhances the desired wicking action. Specifically, the composition and porosity of the wick 30, together with the seal achieved by the gaskets 31, 32, the compression ring 33, and the inner flange 22 of the gas-carrying ring 12, allow for a wide range of differentials between the humidifying liquid pressure and the gas pressure. More exactly, the wick and the accompanying seal effectively self-regulate the pressure differential created across the wick by the humidifying liquid and the gas, thereby obviating the need for pressure regulation machinery that would increase the cost and failure probability of the overall apparatus.

Stack Embodiment

Figure 2:
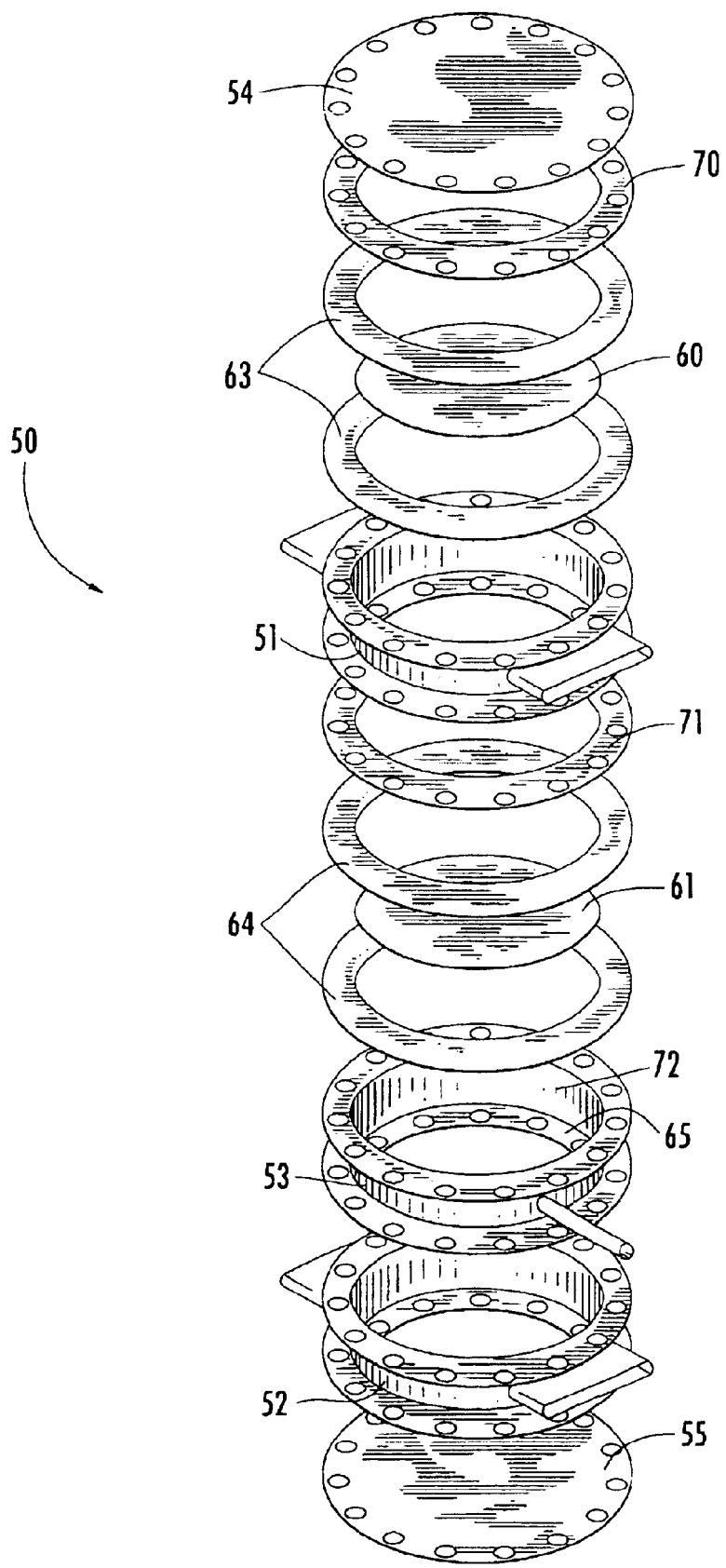
FIG. 2 is an exploded view of a stack embodiment of the invention.

Referring now to FIG. 2, at reference numeral 50 a stack embodiment of the present invention is broadly shown. The illustrated stack includes three primary components: first and second gas-carrying rings 51, 52 and a liquid-carrying ring 53 oriented therebetween. The first and second gas-carrying rings 51, 52 of this embodiment are structured identically to the gas-carrying ring 12 (FIG. 1) described above in connection with the single-wick embodiment. Likewise, the liquid-carrying ring 53 of this embodiment is structured identically to the liquid-carrying ring 11 (FIG. 1) described above in connection with the single-wick embodiment. In addition, the assembly includes a top plate 54 and a bottom plate 55 similar to those described above. Finally, this embodiment includes first and second wicks 60, 61, each with a corresponding pair of gaskets 63, 64 and a corresponding metal compression plate 70, 71.

The wicks 60, 61, gasket pairs 63, 64, and compression plates 70, 71 of this embodiment are arranged and assembled in the same manner as that discussed above in connection with the single-wick embodiment, except that in the stack embodiment, the liquid-carrying ring 53 carries a wick 61 and an accompanying gasket pair 64 and compression plate 71. As described above in connection with the gas-carrying ring of the single-wick embodiment, the wick 61, gasket pair 64, and compression plate 71 are mounted with bolts (not shown) on an inner flange 65 of the liquid-carrying ring 53 of this embodiment. By virtue of the presence of this second wick 61, the humidifying liquid pumped into the liquid-carrying ring 53 is utilized to fill two wicks 60, 61, one on either side of a liquid chamber 72 defined by the liquid-carrying ring 53. This arrangement enables a greater volume of gas to be humidified by the system at any given time, regardless of whether the gas is pumped through the gas-carrying rings 51, 52 in seriatim or in parallel, both of which are viable possibilities for this system.

The stack embodiment may include a much greater number of gas-carrying rings and liquid-carrying rings than that illustrated in FIG. 2. As long as gas-carrying rings and liquid-carrying rings are alternated within the stack as shown in FIG. 2, the volume-enhancing advantage of this embodiment may be realized.

Cascade Embodiment

Figure 3:
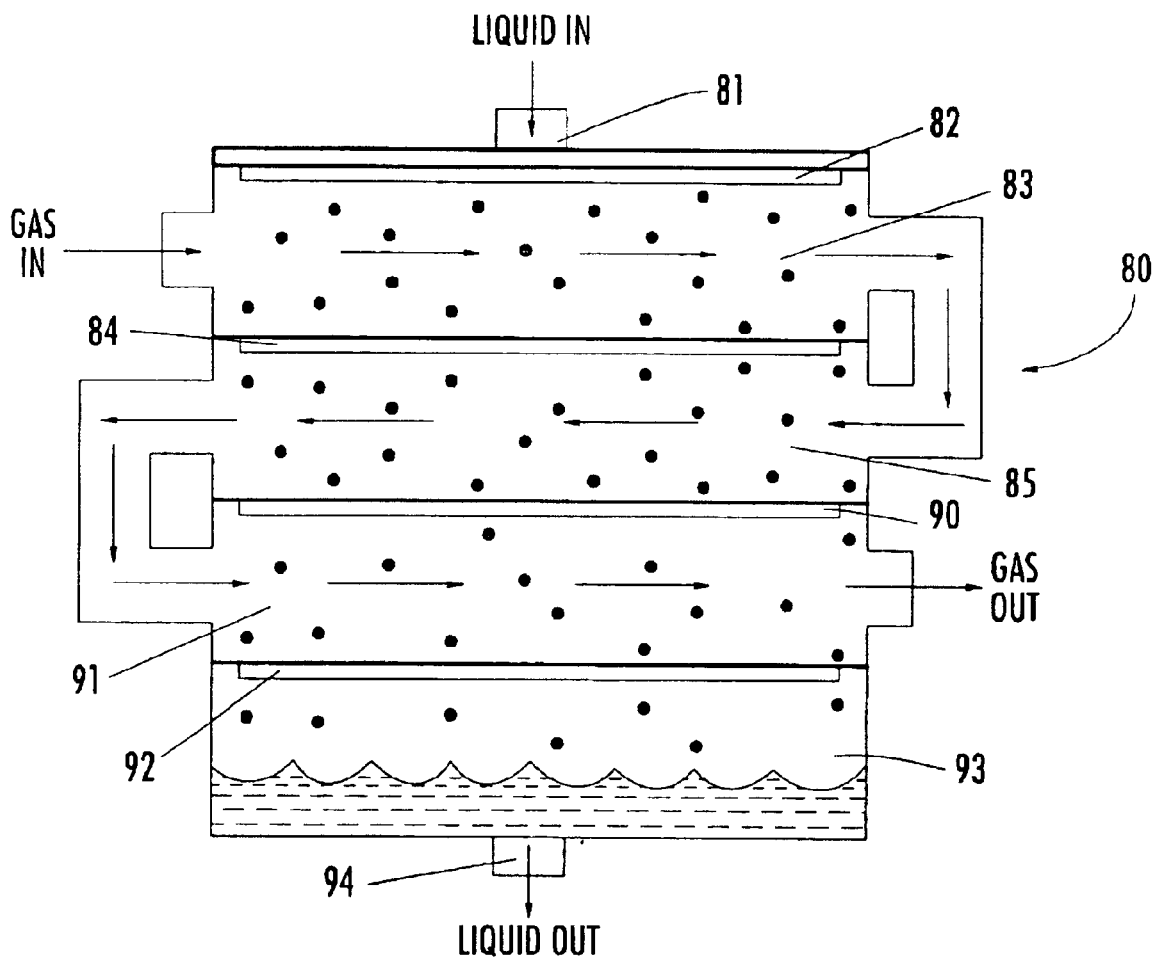
FIG. 3 is a schematic diagram of a cascade embodiment of the invention.

Turning now to FIG. 3, at reference numeral 80 a cascade embodiment of the present invention is broadly shown. In this embodiment, the liquid-carrying rings and the gas-carrying rings described above are utilized to enable a single stream of gas to pass through successive humidification chambers containing less and less humidifying liquid. Specifically, this embodiment includes a liquid-carrying ring or other humidifying liquid source 81 that pumps humidifying liquid into a first wick 82. The first wick 82 is in fluid communication with a first humidification chamber 83, through which a reactant gas flows. Liquid not entrained in the gas in the first humidification chamber 83 then fills a second wick 84 in fluid communication with the first humidification chamber 83, by gravity and/or by force imparted by the flowing gas. The gas then flows from the first humidification chamber 83 to a second humidification chamber 85, wherein the gas encounters the liquid that wicks through the second wick 84 from the first humidification chamber 83. Liquid not entrained in the gas in the second humidification chamber 85 then fills a third wick 90 in fluid communication with the second humidification chamber 85, by gravity and/or by force imparted by the flowing gas. Finally, the gas then flows from the second humidification chamber 85 to a third humidification chamber 91 wherein the gas encounters the liquid that wicks through the third wick 90 from the second humidification chamber 85. Any excess liquid then wicks through a fourth wick 92 into a reservoir 93 before exiting the system through a liquid outlet 94.

This "cascade" embodiment may be implemented through utilization of the liquid-carrying rings and the gas-carrying rings described above. Specifically, the embodiment shown in FIG. 3 could be implemented by arranging three gas-carrying rings in seriatim between two liquid-carrying rings, with each intersection of rings including a wick assembly such as that described above, including a gasket pair and compression plate. The cascade embodiment may also be achieved with fewer or greater stages than that depicted in FIG. 3 without departing from its scope.

This arrangement is particularly advantageous when the pressure of the humidifying liquid is maintained significantly higher than the pressure of the reactant gas. In these situations, too much humidifying liquid is wicked into the first humidification chamber to be fully entrained in the gas. Thus, the cascade embodiment utilizes excess humidifying liquid to further humidify the gas stream.

Compositions and Methods of Manufacture of Porous Wick

A wick that may be utilized in the above-described embodiments of the invention is described in commonly-owned U.S. Pat. No. 6,210,612 B1, issued on Apr. 3, 2001 to Pickrell et al. and titled METHOD FOR THE MANUFACTURE OF POROUS CERAMIC ARTICLES, U.S. Pat. No. 6,235,665 B1, issued on May 22, 2001 to Pickrell et al. and titled POROUS CERAMIC ARTICLES, and U.S. patent application Ser. No. 09/801,044, filed on Mar. 7, 2001 and directed toward novel compositions and methods of manufacture for porous metal articles. These two issued patents and one patent application are incorporated herein by reference, although much of the text and drawings contained therein are included in the present disclosure. Specifically, the wick discussed above in connection with all three embodiments of the present invention is composed and manufactured as hereinafter described.

Porous ceramic articles which may be used as a wick in accordance with the teaching of the invention were formed as set forth in Examples 1–5 below.

EXAMPLE 1

A highly porous zirconia toughened alumina article was prepared by mixing 8.4 weight percent zirconia, 18.2 weight percent alumina with 16.1 weight percent water, 1.2 weight percent nitric acid, 4.3 weight percent starch, 1.1 weight percent petroleum jelly, and 0.8 weight percent pliable hollow polymer spheres. The polymer was acrylic. The average size of the spheres was 80 microns. These constituents were mixed in a Hobart mixer forming a paste with the consistency of bread dough. This mixture was then shaped by pressing in a mold, removed, dried and fired to form the porous ceramic article. The fired article was composed of 72% void volume. The average void size was approximately 80 microns and the voids were very uniformly distributed across the article. Scanning electron microscopy of the article revealed that the pores were highly connected. The average modulus of rupture of these articles with 72% void volume was approximately 4000 psi. Articles of this material have been cycled from room temperature to 2200° F. and back to room temperature in 1.75 hours. The dimensions of the article was approximately 3.25"×2.5"×0.25". After 100 of these thermal cycles, the average strength was still 4000 psi. This demonstrates the excellent thermal shock resistance of these materials. The ability of this material to be shaped in the green state by pressing in molds allows the readily available automatic forming equipment to be used to fabricate the desired articles. These automatic forming equipment not only allow parts to be molded in a short period of time, but also allow very economical production of the parts.

EXAMPLE 2

In another instance, the same procedure was used as in Example 1, except that the weight percent of pliable hollow polymer spheres which were used was increased. The resulting article was composed of 82% void volume with the result in the strength of approximately 2500 psi.

EXAMPLE 3

In another instance, the same procedure was used as in Example 2, except that the weight percent of pliable hollow polymer spheres were increased. The resulting article was composed of 88% void volume with the result in the strength of approximately 1500 psi.

EXAMPLE 4

A highly porous zirconia toughened alumina article was prepared by mixing 8.8 weight percent zirconia, 72 weight percent alumina with 17 weight percent water, 1.3 weight percent nitric acid, and 0.84 weight percent pliable hollow polymer spheres, and 0.1 weight percent of a defoaming agent. Additional water was then added to produce a slurry suitable for slip casting in plaster of paris molds using traditional slip casting techniques. Articles were formed by pouring the slip prepared as above in the plaster of paris molds and allowing suitable time for the molds to absorb the water. The cast parts were then taken from the mold, dried and fired. The average strength of these articles with 72% void volume was approximately 4000 psi. In general, all the physical properties were the same as those described for the pressed material described in Example 1.

EXAMPLE 5

A highly porous zirconia toughened mullite article was prepared by mixing 38.4 weight percent zircon (zirconium silicate), 44.6 weight percent alumina with 15 weight percent water, 1 weight percent nitric acid, 1 weight percent pliable hollow polymer spheres, and 0.01 weight percent of a defoaming agent. The amount of water added was sufficient to produce a slurry suitable for slip casting in plaster of paris molds using traditional slip casting techniques. Articles were formed by pouring the slip prepared as above in the plaster of paris molds and allowing suitable time for the molds to absorb the water. The cast parts were then taken from the mold, dried and fired. The articles formed were composed of approximately 70% void volume space.

EXAMPLE 6

In another instance, solid substantially non-pliable polymer spheres of approximately the same average size as the pliable hollow polymer spheres mentioned in Examples 1–5 were used as a comparison. These solid spheres, which are very hard, were mixed in exactly the same manner as Example 1, except the solid spheres were substituted for the hollow spheres (equal volume percentages of solid spheres were substituted for the hollow spheres to maintain the same fired density). The bodies were dried and fired in exactly the same manner as in Example 1. The measured MOR (strengths) of the sintered body using the solid spheres was only 1350 psi. As a comparison, this is only about one-third to one-half of the strengths obtained when using the pliable hollow spheres.

EXAMPLE 7

In another instance, a commonly used organic filler material, walnut flour, was used in place of the pliable hollow spheres. The proper amount of the walnut flour was determined which would give the same fired density articles as obtained in Example 1. The procedure followed was exactly the same as in Example 1, except the walnut flour was substituted for the pliable hollow spheres and additional water had to be added to make a body suitable for pressing. The articles made in this manner were dried and fired as in Example 1. The resulting articles underwent approximately 5 times the amount of shrinkage as those in Example 1 and were too weak to allow MOR testing to be performed.

Discussion

The preferred range for the volume percent of the hollow pliable polymer sphere for a porous article is between 50% and 95% void volume.

The preferred range for the size of the pliable hollow polymer spheres is between 1 micron and 1000 microns.

As can be seen by comparing the articles which were obtained by Examples 6 and 7 to those of the invention set forth in Examples 1–5, it is clear that the articles of Examples 1–5 are far superior ceramic articles. It is believed that the ceramic articles produced in Examples 1–5 are stronger primarily because cracks do not form during the drying process, which it is believed is due to the fact that the pliable hollow spheres deform when the ceramic matrix contracts during drying. This deformation does not occur when one uses hard solid substantially non-pliable spheres, as indicated in Example 6. It is believed that the strength of this improved article is in the range of 700 psi for a 5% theoretical density to 4500 psi for a 30% theoretical density. The strength is measured by supporting the article at the ends thereof and applying a force to the top of the article until the article breaks. Thus the improved ceramic articles have been shown to be much stronger than the prior art.

In addition, it is believed that the use of pliable hollow spheres enables paths between the resultant spherical voids to occur with more certainty because the adjacent hollow spheres do not have a mere single point of contact, as do hard spheres, but have a substantial area of contact so that connections between the resultant voids are more likely when the adjacent spheres deform.

Figure 4:
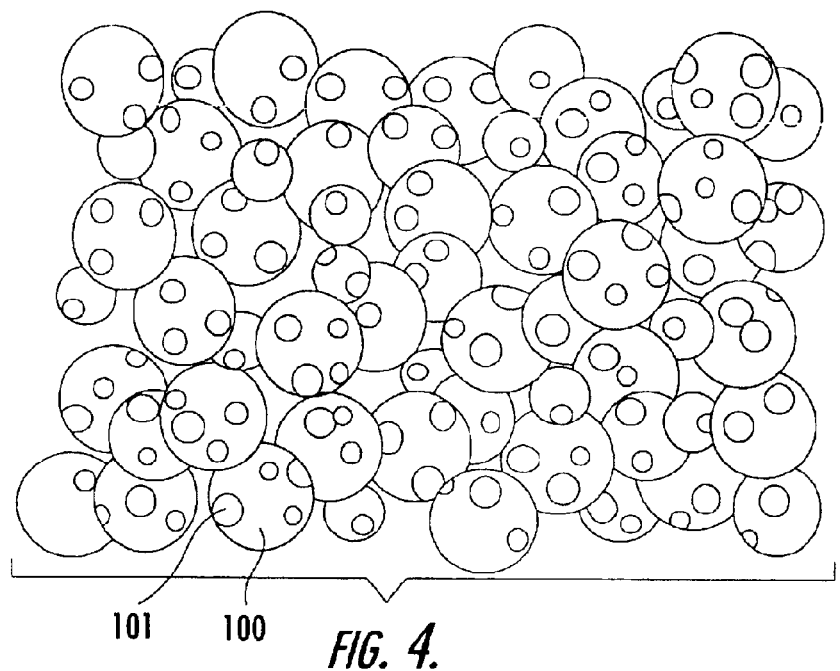
FIG. 4 is a fragmentary view of porous material from which the wick of the humidification system embodying the invention may be formed.

Referring more particularly to FIG. 4, each spherical void 100 includes at least one substantially circular window 101 formed by the intersection of an adjacent spherical void 100. The average diameter of the circular windows 101 is in the range from approximately 10 microns to 50 microns.

Figure 5:
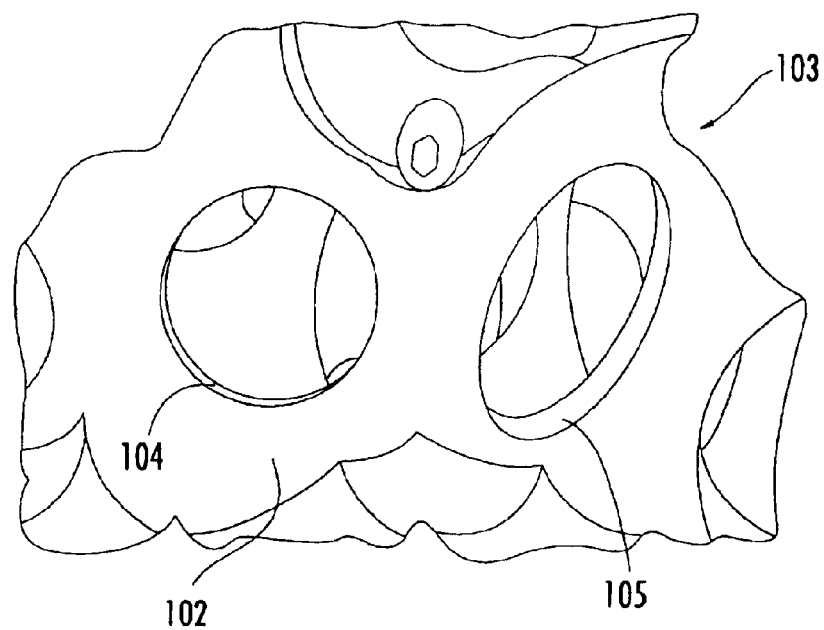
FIG. 5 is a magnified, fragmentary view of FIG. 4.

FIG. 5 shows intersecting spherical voids 102 and 103 having windows 104 and 105, respectively. The windows formed by the intersection of spherical voids 102 and 103 are hidden from view.

Although the above examples involve ceramics formed from zirconium compounds and alumina, the ceramic body may actually be comprised of one or more of the following substances without substantially threatening the functionality of the ceramic body in the present invention: a zirconium compound, aluminum oxide, and silicon oxide.

Porous metal articles which may be used as a wick in accordance with the teachings of the invention were formed as set forth in Examples 8–10 below.

EXAMPLE 8

Polyvinyl alcohol (Avriol 165 manufactured by Airproduct Inc.) and hollow acrylic spheres (PM6545, PQ Corporation) were prepared in 6% and 20% aqueous solutions, respectively. The materials used to form the spheres were a mixture of 2-propenenitrile (polyacrylonitrile) and 2-methyl 2-propenenitrile (polymethacrylonitrile). Powdery FeCrALY metal (22 micron manufactured by Ultrafine Inc.), 6% PVA and 20% hollow spheres were measured at 70, 11.5 and 7.5 weight percentage, respectively, and were mixed in an aqueous solution by a Hobart mixer until it was uniform.

The mixture was cast as a thin film onto a carrier substrate. The thickness of the cast layer was metered by adjusting the gap between the doctor blade and the carrier. The thin sheet was dried in the air and fired at a controlled atmosphere at 2400° F.

The thickness of the sintered thin film was between 0.65 mm and 2 mm. The open porosity of this sintered body was between 50% to 90%.

EXAMPLE 9

Example 9 was conducted similarly with Example 8, except that a FeCrALY metal powder with a different particle size (44 micron manufactured by Ultrafine Inc.) was used. A similar thickness and porosity of the sintered metal article was obtained in this Example. However, the pore size distribution of the resulting sintered article was somewhat different from the samples prepared in Example 8.

A comparison of metal articles produced in accordance with Examples 8 and 9 is set forth in the chart below.

| AVERAGE POWDER SIZE | AVERAGE PORE SIZE | |
|---|---|---|
| | 1ST FIRING CYCLE | 2ND FIRING CYCLE |
| 22 Microns | 25.74 Microns | 21.14 Microns |
| 44 Microns | 38.7 Microns | 35.9 Microns |

EXAMPLE 10

The mixture can be prepared in the same manner as in Example 8, except a different binder (2.9% Kelzan) was used and the FeCrALY powder, 2.9% Kelzan and 20% hollow spheres were used at weight percentage of 78, 5 and 7, respectively. The dough mixture was charged in a mold and shaped by pressing. The pressed part was removed from the mold, dried and fired as in Example 8.

The thickness of the sintered body is larger than 2 mm. The open porosity of this sintered body was between 50% to 90%.

The preferred weight percent ranges of the materials used to form the slurry or dough in Examples 8–10 are set forth below.

| COMPONENTS | WEIGHT (%) |
|---|---|
| 20% Polymer Spheres | 0.05–8 |
| Metal Powder | 60–89 |
| 2.9% Kelzan or 6% PVA | 3–20 |
| Water | 0–40 |

The top firing temperature for a given metal article is usually at the 80% to 96% of the melting point of metal. The firing should be done in a low oxygen environment to avoid oxidation of the metal.

Typical three point bending strength of stainless steel sample are as follows:

| SAMPLE | MOR (psi) | % |
|---|---|---|
| GS002 | 6988.57 | 23.66 |
| GS003 | 5409.73 | 24.15 |
| GS004 | 5702.97 | 33.03 |
| GS005 | 4470.79 | 31.19 |

In Examples 8–9 above, the mixture of metal powder, hollow spheres and other additives is made into a slurry and cast on a carrier substrate in a process commonly called tape casting. By changing the binders and/or the total solids content, other forming methods can be employed. For example, by making the mixture into a thicker dough rather than a castable slurry, extruded tubes of the mixture may be formed. Similarly, as shown in Example 10, parts could be ram pressed or slip cast. The choice of forming method depends mostly on the geometry of the part desired.

Any metal which can be obtained as a powdered metal and which can be at least partially sintered may work in this process. In addition, some metals, such as copper, may be formed from their oxides and then reduced to the metal during the heat treating/sintering step. Metals of particular interest include steel and steel alloys, stainless steel, iron, copper, brass, bronze, aluminum, aluminum alloys, titanium, chromium, nickel and FeCrALY. One or more of these metals and alloys may be employed in the metal body without substantially threatening the functionality of the metal body in the present invention.

The fact that the spheres are hollow is more important in the metal version because the metal article should be fired in a low oxygen environment to avoid oxidizing the metal. The spheres will not burn in a low oxygen environment and thus must be volatilized. Hollow spheres have much less mass than solid spheres and are easier to substantially completely volatilize.

Resiliency of the organic spheres is also important to prevent cracking of the article during firing for both the ceramic and metal versions. The resiliency of the hollow acrylic polymer microspheres was compared with polystyrene spheres. A cylindrical tube was filled with spheres and put under pressure using an Instron strength-testing machine. Both polystyrene spheres and polymer microspheres were evaluated.

The first experiment was performed in order to determine the force necessary to compress the spheres. Water was added to the polymer microspheres so that the mixture was 20% spheres by weight. This was done so that the spheres were more manageable and more easily contained. It was not necessary to add water to the polystyrene spheres. As the load was applied to the 80 gram plunger, the load and the corresponding volume of spheres were recorded.

The second experiment involved placing the spheres under a load of 40 pounds and then increasing the force to 62 pounds and then releasing the load on the plunger and recording the volume increase. The volume of the spheres at 40 pounds was used as 100% volume for comparison between the two types of spheres. The volume at a force of 40 pounds was used as a starting point for comparison since it was not possible to ascertain whether the spheres were closely packed and, therefore, the true starting volume could not easily be identified.

The polymer microspheres were more easily compressed than the polystyrene at forces less than 13 pounds, but gradually showed more resistance as the force was increased. In addition, the polymer microspheres regained 102% of the marked volume at 40 pounds after compression to 62 pounds, while the polystyrene spheres only regained 87% of the volume marked at 40 pounds. Both of the experiments indicate that the polymer microspheres have a higher resiliency than the polystyrene.

Up to the heat treatment stage, the processing of the metal version is substantially the same as the ceramic version. There may be minor differences in the optimum amount and type of binder. During the heat treating stage for the metal version, the hollow spheres are removed by volatilization or oxidation. In the volatilization, the organic compounds dissociate and decompose into gaseous species at high temperature and low pressure and may be removed by using a vacuum or by gas sweeping.

The metal embodiments of the porous wick may exhibit void volume, pore diameter, and overall pore structure and pore arrangement similar to that described above in connection with the ceramic embodiments and illustrated in FIGS. 4 and 5.

A gas humidification system is described above. Various details of the invention may be changed without departing from its scope. Furthermore, the foregoing description of the invention and the best mode for practicing the invention are provided for the purpose of illustration only and not for the purpose of limitation—the invention being defined by the claims.

What is claimed is:

1. A method for humidifying reactant gases for use in a fuel cell, said method comprising the steps of:
    providing a housing defining a humidification chamber through which a reactant gas travels before participating in an electrochemical reaction in a fuel cell;
    further providing a humidification assembly adjacent to said housing, said humidification assembly comprising a porous wick and a source of humidifying liquid, wherein said porous wick
        comprises a ceramic formed from a mixture comprising water, nitric acid, hollow polymer spheres, and at least one substance selected from the group consisting of a zirconium compound, aluminum oxide, and silicon oxide, and
        separates the source of humidifying liquid from the humidification chamber such that the humidifying liquid flows through the wick before humidifying the reactant gas traveling through the humidification chamber;
    communicating the humidifying liquid into the wick;
    receiving the reactant gas in the humidification chamber; and
    humidifying the reactant gas with humidifying liquid as the reactant gas flows across the wick in the humidification chamber.

2. A method for humidifying reactant gases for use in a fuel cell, said method comprising the steps of:
    providing a housing defining a humidification chamber through which a reactant gas travels before participating in an electrochemical reaction in a fuel cell;
    further providing a humidification assembly adjacent to said housing, said humidification assembly comprising a porous wick and a source of humidifying liquid, wherein said porous wick
        comprises a metal formed from a mixture comprising metal powder, a binding agent, water, and hollow polymer spheres, and
        separates the source of humidifying liquid from the humidification chamber such that the humidifying liquid flows through the wick before humidifying the reactant gas traveling through the humidification chamber;
    communicating the humidifying liquid into the wick;
    receiving the reactant gas in the humidification chamber; and
    humidifying the reactant gas with humidifying liquid as the reactant gas flows across the wick in the humidification chamber.

3. A method according to claim 2, wherein said metal powder comprises at least one substance selected from the group consisting of iron, chromium, bronze, brass, copper, and nickel.

* * * * *